United States Patent [19]

Choquette

[11] 4,078,283
[45] Mar. 14, 1978

[54] METHOD FOR MAKING EYEGLASS FRAMES

[76] Inventor: Jacques Choquette, 20F Harbour Village, Branford, Conn. 06405

[21] Appl. No.: 710,239

[22] Filed: Sep. 7, 1976

[51] Int. Cl.² .............................................. G02C 5/00
[52] U.S. Cl. ......................................... 29/20; 269/47; 351/178
[58] Field of Search ...................... 29/20; 269/47, 48.1, 269/54.4, 54.5; 351/178

[56] References Cited

U.S. PATENT DOCUMENTS

| 684,811 | 10/1901 | Grove | 269/47 X |
|---|---|---|---|
| 1,739,696 | 12/1929 | Spill | 351/178 UX |
| 2,582,798 | 1/1952 | Russell et al. | 29/20 UX |
| 3,288,666 | 11/1966 | Dacey | 351/178 UX |
| 3,756,704 | 9/1973 | Marks | 29/20 |
| 3,777,605 | 12/1973 | Spier | 269/48.1 X |
| 3,868,438 | 2/1975 | Fedon et al. | 351/178 X |

*Primary Examiner*—Othell M. Simpson
*Assistant Examiner*—Horace M. Culver
*Attorney, Agent, or Firm*—McCormick, Paulding & Huber

[57] ABSTRACT

A method for making eyeglass frames from thermoplastic material and the like comprising the steps of drilling four holes in the blank and placing the blank on a first fixture having two locating dowels and two expandable pins. The external frame contour is then milled and all necessary contours are milled on the front, rear, sides and ends of the frame, reversing the frame on the fixture as necessary. Finally, the frame is removed from the fixture and placed in a second fixture which engages and holds the frame externally. Lense openings and lense grooves in the walls thereof are thereafter machined.

9 Claims, 19 Drawing Figures

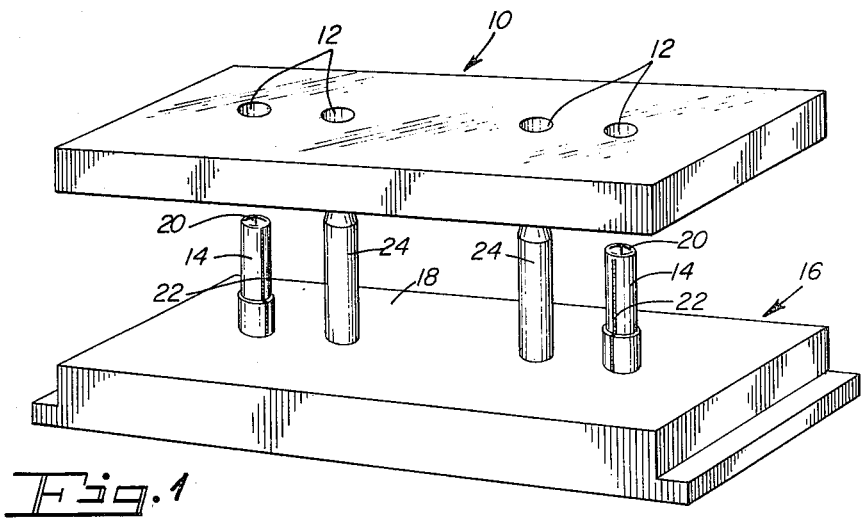
Fig. 1
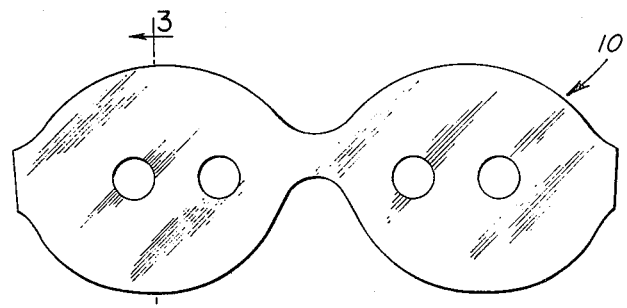
Fig. 2    Fig. 3
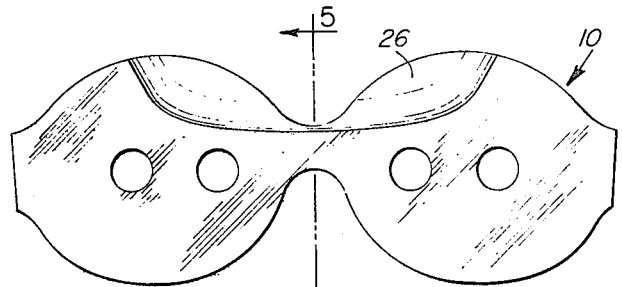
Fig. 4    Fig. 5
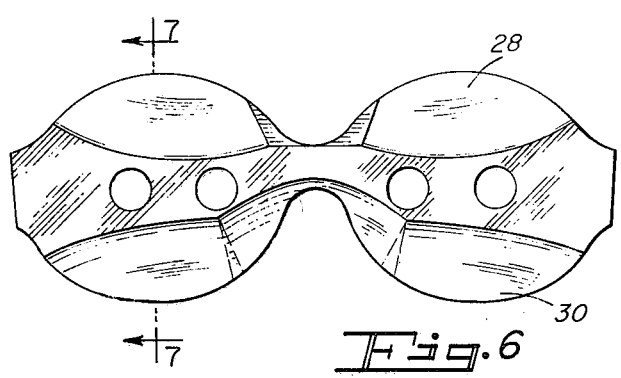
Fig. 6    Fig. 7

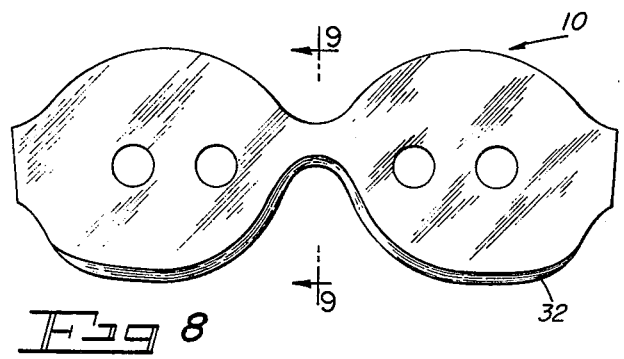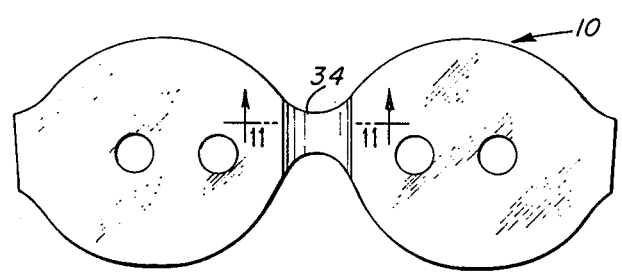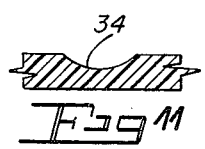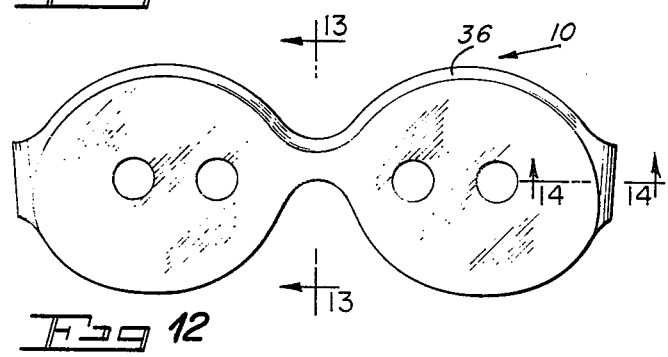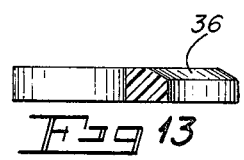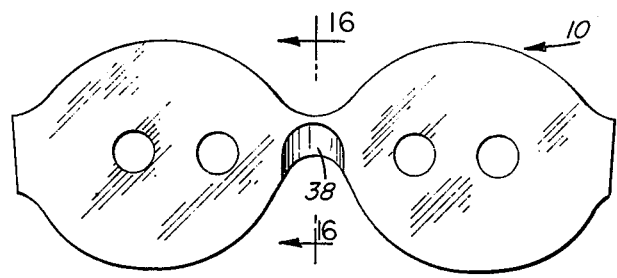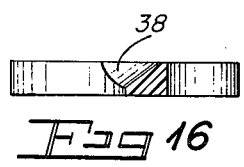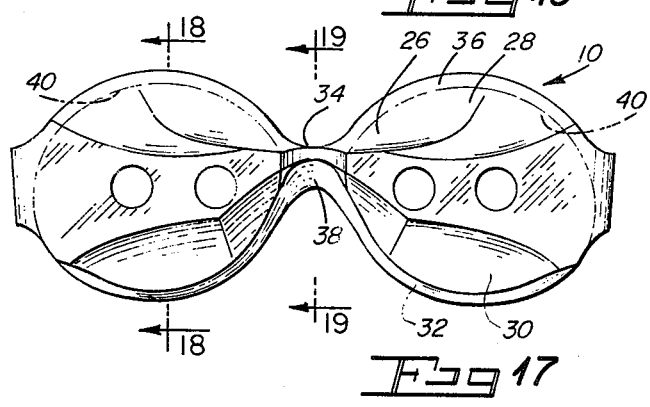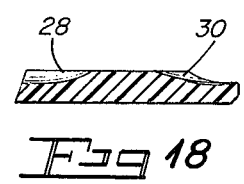

METHOD FOR MAKING EYEGLASS FRAMES

BACKGROUND OF THE INVENTION

Eyeglass frames of thermoplastic and the like have been manufactured in the past in plastic molding processes and in the case of frames manufactured in relatively limited numbers, machining processes have been employed with the lense openings being machined initially and the external shaping and contouring of the frames being accomplished subsequently. Such processes are generally satisfactory, but certain disadvantages are encountered. A special fixture may be required for each lense opening of different size and shape, and external machining must be accomplished on a relatively fragile frame with the lense opening areas removed.

SUMMARY OF THE PRESENT INVENTION

It is the general object of the present invention to provide a method for making eyeglass frames from thermoplastic material and the like wherein all necessary contours on front, rear, side and end surfaces of the frames are machined prior to machining of the lense openings, and wherein a universal fixture is provided with at least two locating and supporting members which enter openings in the areas subsequently to be removed for the mounting of lenses.

BRIEF DESCRIPTION OF THE DRAWINGS

FIG. 1 of the drawing is a perspective view illustrating a blank for making an eyeglass frame in position above a fixture adapted to locate and hold the blank.

FIG. 2 is a rear view illustrating the blank after machining of the same to provide the external frame configuration.

FIG. 3 is a cross sectional view taken generally as indicated at 3—3 in FIG. 2.

FIG. 4 is a rear view showing the blank machined for a "brow line clearance".

FIG. 5 is a cross sectional view taken generally as indicated at 5—5 in FIG. 4.

FIG. 6 is a rear view illustrating the blank with top and bottom "inside bevels" machined.

FIG. 7 is a cross sectional view taken generally as indicated at 7—7 in FIG. 6.

FIG. 8 is a rear view of the blank with "nose and cheek bevels" machined.

FIG. 9 is a cross sectional view taken generally as indicated at 9—9 in FIG. 8.

FIG. 10 is a rear view of the blank with an "initial bridge bevel" machined.

FIG. 11 is a cross sectional view taken generally as indicated at 11—11 in FIG. 10.

FIG. 12 is a front view of the blank with "front face contouring" accomplished.

FIG. 13 is a cross sectional view taken generally as indicated at 13—13 in FIG. 12.

FIG. 14 is a cross sectional view taken generally as indicated at 14—14 in FIG. 12.

FIG. 15 is a rear view of the blank with a "final inside bridge bevel" machined thereon.

FIG. 16 is a cross sectional view taken generally as indicated at 16—16 in FIG. 15.

FIG. 17 is a front view showing a blank with all previous machining operations.

FIG. 18 is a cross sectional view taken generally as indicated at 18—18 in FIG. 17.

DESCRIPTION OF THE PREFERRED EMBODIMENT

Figure 19:
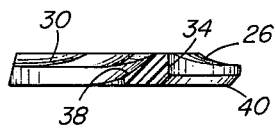
FIG. 19 is a cross sectional view taken generally as indicated at 19—19 in FIG. 17.

In accordance with the method of the present invention and a first step thereof, a solid flat blank of thermoplastic material or the like is provided with dimensions slightly larger than a finished eyeglass frame and with at least one through opening in each of the areas subsequently to be removed for the mounting of a lense. As illustrated in FIG. 1, a blank 10 is of generally flat rectangular configuration and has two drilled through openings 12,12 in each of the areas to be removed for lense insertion. The openings 12,12 are spaced apart and the outermost openings 12,12 respectively receive upright locating and supporting members 14,14 on a fixture 16 having a flat upper surface 18 for supporting the blank 10. The members 14,14 preferably take the form of expandable and contractable pins and such expansion and contraction may be accomplished by means of screws 20,20 received in suitably threaded axial openings in the pins. The pins are split axially as at 22,22 for expansion and contraction.

Preferably, locating dowels 24,24 are also provided for entry in the innermost openings 12,12. The dowels 24,24 are slightly longer than the pins 14,14 and have arcuate generally cone-shaped upper end portions so as to enter the innermost openings 12,12 prior to entry of the pins 14,14 in their respective openings 12,12. Thus, a blank such as 10 may be readily and conveniently disposed in position on the fixture 16 by moving the same downwardly to first enter the dowels 24,24 in their openings 12,12 and to thereafter enter the pins 14,14 in their openings. The pins 14,14 are of course maintained in a contracted condition during mounting of a blank on the fixture and after the blank has been placed in position, the screws 20,20 may be turned as required to expand the pins 14,14 and thus to retain the blanks securely in the desired position for machining.

Machining of the eyeglass frame may take various forms within the scope of the present method, but a milling is presently preferred. That is, with the blank 10 on its fixture 16, the external contour of the frame may be conveniently milled as illustrated in FIG. 2. The outside frame contour or configuration may of course vary from frame to frame and several different types of frames are accommodated by the fixture 16 so as to effect a substantial savings in production cost. The fixture 16 may accordingly be regarded as a universal fixture. Still further, it will be apparent that a large mass of material remains after milling of the external contour, the size of the openings 12,12 being relatively small in relation to the overall size of the frame blank and the contoured frame 10. Problems encountered in milling fragile or delicate frames with the lense openings previously machined are thus avoided.

Referring now to FIG. 4, it will be observed that a second milling operation has been accomplished on the frame 10. More specifically, a "brow line clearance" is provided at 26 and constitutes a scallop-shaped or gradual arcuate cut-out at an upper rear portion of the frame.

In FIG. 6, top and bottom "inside bevels" have been provided on the frame respectively at 28 and 30. Such "bevels" constitute gradual arcuate contours extending from intermediate portions of the frame respectively upwardly and downwardly to the top and bottom edges thereof. It is to be noted that the openings 12,12 are so sized as not to interfere with the milling operation.

In FIG. 8, a further milling operation has been accomplished on the frame at 32 and it will be observed that the resulting contour is shown individually, that is, the frame is shown only with a "nose and cheek bevel" and the preceeding operations are eliminated for clarity of illustration. The "nose and cheek bevels" constitute a slight rounding or bevelling of the lower inside edge portions of the frame 10.

In FIG. 10, an "initial bridge" bevel is illustrated and again previous contouring is eliminated for clarity of illustration. The initial bridge bevel 34 takes the form of a shallow arcuate trough extending along a vertical axis and located in the bridge portion of the frame.

In FIG. 12, the frame 10 is shown in a reversed position. That is, the frame is shown removed from the fixture and turned through 180° so as to present the front side of the frame for machining. Further, a machining operation involving "front face contouring" is illustrated at 36. "Front face contouring" takes the form of a rounding or bevelling of upper and side edges of the frame.

In FIG. 15, the frame 10 has been once again removed from the fixture 16 and returned to its original position. That is, the frame is shown rotated through 180° so as to again present its rear side for machining. A final "inside bridge bevel" 38 is illustrated and constitutes a partial trough or scallop along a vertical axis and disposed at a lower portion of the bridge portion of the frame.

FIG. 19 illustrates the aggregate machining operation or a substantially complete frame in which all of the aforesaid machining operations are illustrated. Further, broken lines 40,40 illustrate the lense openings. The lense openings are provided in accordance with the present invention by removing the frame 10 from the fixture 16 and placing the same in a second fixture not illustrated but which engages and grips the frame externally. Thus, conventional machining of lense openings and grooves in the walls thereof can be readily accomplished.

As will be apparent from the foregoing, a method of eyeglass manufacture has been provided wherein a relatively simple and yet substantially universal fixture can be employed. Tooling costs are thus substantially reduced. The method is nevertheless relatively simple and straightforward in execution. The location and retention of the eyeglass frame by means of the four small openings 12,12 provides for a high degree of strength and rigidity in the frame during the machining operations on external portions thereof. In consequence, the machining operations can be carried out rapidly, accurately and without concern for breakage of fragile frames as in the case of a machining method wherein the lense openings are provided initially and external machining thereafter accomplished.

I claim:

1. A method for making eyeglass frames from thermoplastic material and the like, said method comprising the steps of providing a solid flat blank having dimensions slightly larger than a finished frame and forming at least one through opening in each of two areas to be subsequently removed for mounting lenses, each through opening being substantially smaller than the area to be removed for a lense opening, providing a fixture having a flat upper surface for supporting the blank and at least two upright locating and supporting members, said members being spaced apart a distance equal to the spacing between said two through openings and adapted respectively to enter and to engage the walls of the openings whereby to secure the blank in position for machining, first placing the blank on said fixture with said two upright members respectively entered in and in engagement with the walls of said through openings, then machining the blank to the external configuration of the frame and machining external contours on the frame, and thereafter machining two lense openings in the blank and machining lense grooves in the side walls of the openings.

2. A method for making eyeglass frames from thermoplastic material and the like as set forth in claim 1 wherein said upright locating and supporting members are expandable and contractable laterally and wherein said members are entered in said openings in a contracted condition and thereafter expanded into engagement with the walls thereof.

3. A method for making eyeglass frames from thermoplastic material and the like as set forth in claim 2 wherein a second through opening is provided in the blank in each of the areas to be removed for lense mounting, and wherein two additional upright members are provided on the fixture and respectively entered in said second through openings whereby to locate the blank precisely for machining.

4. A method for making eyeglass frames from thermoplastic material and the like as set forth in claim 2 wherein the step of machining external contours includes the step of making a brow-line clearance on a rear side of the frame.

5. A method for making eyeglass frames from thermoplastic material and the like as set forth in claim 4 wherein the step of machining external contours includes the step of machining top and bottom inside bevels on a rear side of the frame.

6. A method for making eyeglass frames from thermoplastic material and the like as set forth in claim 5 wherein the step of machining external contours includes the step of machining nose and cheek bevels on a rear side of the frame.

7. A method for making eyeglass frames from thermoplastic material and the like as set forth in claim 6 wherein the step of machining external contours includes the step of machining an initial bridge bevel on a rear side of the frame.

8. A method for making eyeglass frames from thermoplastic material and the like as set forth in claim 7 wherein the step of machining external contours includes the step of turning the frame through 180° on the fixture and machining the front face contours on the frame.

9. A method for making eyeglass frames from thermoplastic material and the like as set forth in claim 8 wherein the step of machining external contours includes the step of returning the frame through 180° to its initial attitude on the fixture and machining a final bridge bevel on a rear side of the frame.

* * * * *